United States Patent
Israel et al.

(10) Patent No.: US 10,564,374 B2
(45) Date of Patent: Feb. 18, 2020

(54) ELECTRO-OPTICAL INTERCONNECT PLATFORM

(71) Applicant: Teramount Ltd., Jerusalem (IL)

(72) Inventors: Abraham Israel, Jerusalem (IL); Hesham Taha, Jerusalem (IL)

(73) Assignee: Teramount Ltd., Jerusalem (IL)

( * ) Notice: Subject to any disclaimer, the term of this patent is extended or adjusted under 35 U.S.C. 154(b) by 0 days.

(21) Appl. No.: 15/724,966

(22) Filed: Oct. 4, 2017

(65) Prior Publication Data

US 2018/0031791 A1    Feb. 1, 2018

Related U.S. Application Data

(63) Continuation-in-part of application No. 14/878,591, filed on Oct. 8, 2015, now Pat. No. 9,804,334.

(60) Provisional application No. 62/405,476, filed on Oct. 7, 2016.

(51) Int. Cl.
| | |
|---|---|
| *G02B 6/43* | (2006.01) |
| *G02B 6/26* | (2006.01) |
| *G02B 6/13* | (2006.01) |
| *G02B 6/136* | (2006.01) |
| *G02B 6/124* | (2006.01) |
| *G02B 6/30* | (2006.01) |
| *G02B 6/12* | (2006.01) |

(52) U.S. Cl.
CPC ........... *G02B 6/43* (2013.01); *G02B 6/12002* (2013.01); *G02B 6/124* (2013.01); *G02B 6/13* (2013.01); *G02B 6/136* (2013.01); *G02B 6/262* (2013.01); *G02B 6/30* (2013.01)

(58) Field of Classification Search
None
See application file for complete search history.

(56) References Cited

U.S. PATENT DOCUMENTS

| | | | |
|---|---|---|---|
| 4,744,618 | A | 5/1988 | Mahlein |
| 5,913,002 | A | 6/1999 | Jiang |
| 5,939,782 | A * | 8/1999 | Malladi ................. H01L 23/642 257/698 |
| 6,122,417 | A | 9/2000 | Jayaraman et al. |
| 6,198,864 | B1 | 3/2001 | Lemoff et al. |
| 6,271,970 | B1 | 8/2001 | Wade |

(Continued)

FOREIGN PATENT DOCUMENTS

| | | |
|---|---|---|
| EP | 2639978 A1 | 9/2013 |
| RU | 2438209 C1 | 12/2011 |

(Continued)

OTHER PUBLICATIONS

Foreign Office Action and Search Report for ROC (Taiwan) Patent Application No. 105121625 dated Sep. 5, 2017 from IPO (Intellectual Property Office) of Taiwan.

(Continued)

*Primary Examiner* — Tina M Wong
(74) *Attorney, Agent, or Firm* — M&B IP Analysts, LLC

(57) ABSTRACT

An electro-optical interconnection platform is provided. The platform includes an interface medium; a plurality of optical pads; a plurality of electrical pads; and at least one beam coupler adapted to optically couple at least one pair of optical pads of the plurality of optical pads, wherein the at least one pair of optical pads are placed on opposite sides of the interface medium.

16 Claims, 9 Drawing Sheets

(56) References Cited

U.S. PATENT DOCUMENTS

| | | |
|---|---|---|
| 6,600,845 B1 | 7/2003 | Feldman et al. |
| 6,832,031 B2 | 12/2004 | Smaglinski |
| 6,862,092 B1 | 3/2005 | Ibsen et al. |
| 6,888,988 B2 | 5/2005 | Vancoille et al. |
| 6,941,047 B2 | 9/2005 | Capewell et al. |
| 7,050,304 B2 * | 5/2006 | Hsu .................... H01L 23/367 165/185 |
| 7,058,275 B2 | 6/2006 | Sezerman et al. |
| 7,139,448 B2 * | 11/2006 | Jain ...................... G02B 6/43 385/14 |
| 7,260,328 B2 | 8/2007 | Kropp |
| 7,288,756 B2 | 10/2007 | Sheffer et al. |
| 7,317,746 B2 | 1/2008 | Ericson et al. |
| 7,447,404 B2 | 11/2008 | Miller |
| 7,853,101 B2 * | 12/2010 | Carothers ............ H04B 10/801 385/15 |
| 7,970,041 B2 | 6/2011 | Arimoto et al. |
| 8,000,565 B2 | 8/2011 | Liu |
| 8,117,982 B2 | 2/2012 | Gruber et al. |
| 8,390,806 B1 | 3/2013 | Subramanian |
| 8,471,467 B2 | 6/2013 | Boerner |
| 8,582,934 B2 | 11/2013 | Adler et al. |
| 8,834,146 B2 | 9/2014 | Saha et al. |
| 8,836,942 B2 | 9/2014 | Quan et al. |
| 8,929,693 B2 | 1/2015 | Shin et al. |
| 9,099,581 B2 | 8/2015 | Na et al. |
| 9,429,725 B2 | 8/2016 | Shao et al. |
| 9,496,248 B2 * | 11/2016 | Lee ........................ H01L 25/18 |
| 2002/0118907 A1 | 8/2002 | Sugama et al. |
| 2002/0131180 A1 | 9/2002 | Goodman |
| 2002/0164129 A1 | 11/2002 | Jackson |
| 2003/0002809 A1 | 1/2003 | Jian |
| 2003/0043157 A1 | 3/2003 | Miles |
| 2003/0142896 A1 * | 7/2003 | Kikuchi .................. G02B 6/42 385/14 |
| 2004/0184704 A1 | 9/2004 | Bakir et al. |
| 2005/0025430 A1 | 2/2005 | Bhagavatula et al. |
| 2005/0276613 A1 | 12/2005 | Welch et al. |
| 2009/0178096 A1 | 7/2009 | Menn et al. |
| 2009/0262346 A1 | 10/2009 | Egloff et al. |
| 2010/0002987 A1 | 1/2010 | Hata et al. |
| 2011/0091167 A1 | 4/2011 | Nishimura |
| 2011/0280573 A1 | 11/2011 | Collings et al. |
| 2011/0293281 A1 | 12/2011 | Sakurai |
| 2012/0002284 A1 | 1/2012 | McColloch et al. |
| 2012/0063721 A1 | 3/2012 | Chen |
| 2013/0044977 A1 | 2/2013 | Amit |
| 2013/0109083 A1 | 5/2013 | Llobera |
| 2013/0129281 A1 | 5/2013 | Son et al. |
| 2014/0023098 A1 | 1/2014 | Clarkson et al. |
| 2014/0064559 A1 | 3/2014 | Sugasawa et al. |
| 2014/0226988 A1 | 8/2014 | Shao et al. |
| 2014/0363165 A1 | 12/2014 | Panotopoulos et al. |
| 2015/0050019 A1 | 2/2015 | Sengupta |
| 2015/0124336 A1 | 5/2015 | Kaufman |
| 2016/0161686 A1 * | 6/2016 | Li ........................ G02B 6/4214 385/92 |
| 2016/0195677 A1 | 7/2016 | Panotopoulos et al. |
| 2018/0031791 A1 * | 2/2018 | Israel .................... G02B 6/4214 |

FOREIGN PATENT DOCUMENTS

| | | |
|---|---|---|
| RU | 2485688 C2 | 6/2013 |
| RU | 2577669 C2 | 3/2016 |
| WO | 2001067497 A1 | 9/2001 |

OTHER PUBLICATIONS

O'Brien, "Silicon Photonics Fiber Packaging Technology", Photonics Packaging Group, Tyndall National Institute, Cork, Ireland, Sep. 2012.

Barwicz, et al., "Assembly of Mechanically Compliant Interfaces Between Optical Fibers and Nanophotonic Chips", IEEE 64th Electronics Components and Technology Conference, Orlando, Fl., May 27-30, 2014.

Bogaerts, "Helios Lecture: Coupling Light To Silicon Photonic Circuits", Silicon Photonics—PhD Course prepared within FP7-224312 Helios Project, Ghent University-IMECGhent, Belgium, Nov. 2009.

Chiral Photonics., "Fiber Coupler Overview", Pinebrook, NJ, Jan. 2013.

Cunningham, et al., "Aligning Chips Face-to-Face for Dense Capacitive and Optical Communication", IEEE Transactions on Advanced Packaging, vol. 33, No. 2, May 2010.

Hou, et al., "Physics of Elliptical Reflectors at Large Reflection and Divergence Angles I: Their Design for Nano-Photonic Integrated Circuits and Application to Low-loss Low-crosstalk Waveguide Crossing", Northwestern University, Evanston, IL., Apr. 2012.

Kopp, et al., "Silicon Photonic Circuits: On-CMOS Integration, Fiber Optical Coupling, and Packaging", IEEE Journal of Selected Topics in Quantum Electronics, Aug. 2010.

Kurata, et. al., "Prospect of Chip Scale Silicon Photonics Transceiver for High Density Multi-mode Wiring System", Photonics Electronics Technology Research Association (PETRA), Japan, 2015, pp. 1-7.

Nguyen, et al., "Silicon-based Highly-efficient Fiber-to-waveguide Coupler for High Index Contrast Systems", Applied Physics Letters, American Institute of Physics, downloaded Feb. 29, 2012, published online Feb. 24, 2006.

PCL Connections LLC, all rights reserved, "In-Line Coupling Element (ICE) for Bonded Grating Coupling to Silicon PICs", Columbus, OH., May 2013.

The International Search Report and The Written Opinion for PCT/US2016/038047, ISA/RU, Moscow, Russia, dated Oct. 13, 2016.

Zimmerman, "State of the Art and Trends in Silicon Photonics Packaging", Silicon Photonics Workshop, Technische Universitat Berlin, May 2011.

CAMAPA, CD-ROM, pp. 58, 59, 79, Russia, 2012.

The International Search Report and The Written Opinion for PCT/US2017/055146, ISA/RU, Moscow, Russia, dated Jan. 31, 2018.

The European Search Report for EP Application No. 16854021.9 dated Aug. 21, 2018, EPO, The Hague.

Notice of Deficiencies for EP Application No. 16854021.9 dated Jun. 24, 2019, EPO, Rijswijk, Netherlands.

The First Chinese Office Action for Chinese Patent Application No. 2016800557192, dated Aug. 22, 2019, China, CNIPA.

* cited by examiner

ELECTRO-OPTICAL INTERCONNECT PLATFORM

CROSS-REFERENCE TO RELATED APPLICATIONS

This application claims priority from U.S. Provisional Application No. 62/405,476 filed Oct. 7, 2016. This application is also a continuation-in-part of U.S. patent application Ser. No. 14/878,591 filed on Oct. 8, 2015, now pending, the contents of which are hereby incorporated by reference.

TECHNICAL FIELD

The present disclosure relates generally to coupling an optical fiber to a substrate, and more particularly to coupling the optical components to an optoelectronic integrated circuit (IC).

BACKGROUND

Communications systems and datacenters are required to handle massive amount of data at ever increasing speeds and ever decreasing costs. To meet these demands, optical fibers and optical ICs (such as, a photonic integrated circuit (PIC) or an integrated optical circuit) are used together with high speed electronic ICs. A PIC is a device that integrates multiple photonic functions (similar to an electronic IC or radio frequency (RF) IC). PICs are typically fabricated using indium phosphide or silicon oxide ($SiO_2$), which allows for the integration of various optically active and passive functions on the same circuit.

The coupling of PICs to optical fibers is not as well advanced as the integration and/or coupling of electronic ICs. Specifically, the challenges facing optical connections are different and much more complex than connecting electronic ICs to, for example, a printed circuit board (PCB). Some difficulties are inherent in wavelength, signal losses, assembly tolerance, and polarization characteristics of optical packaging.

Existing solutions utilize various techniques for connecting optical fibers to PICs. One technique suggests using various types of butt connections to the edge and surface fiber connections a PIC. The butt of a fiber can be connected to a planar waveguide at the edge of a PIC. This technique is efficient only if the cross section of the propagating mode of the fiber and the waveguide areas of the fiber core and the waveguide are of similar size. In most cases, this technique suffers from poor assembly tolerance.

Another technique suggests laying a section of fiber on top of the surface of the PIC where the end of the fiber has been cut at an angle to form an angled tip. The angled tip has a flat surface which reflects a light beam down to a waveguide grating coupler disposed on the integrated circuit. The light beam is reflected off the reflective surface of the angled tip by total internal reflection. The waveguide grating coupler is designed to accept the slightly diverging light beam from the reflective surface of the angled tip of the fiber. The light beam can also propagate through the fiber to a chip coupler in the opposite direction, up from the substrate, through the waveguide grating and into an optical fiber after bouncing off the reflective surface of the angled tip. This technique further requires coating the exterior of the reflective surface with an Epoxy.

Among others, all of the above-noted techniques require precise alignment, and thus active positioning of the optical fiber to the PIC. As such, current techniques suffer from poor and very tight alignment tolerance to gain an efficient connectivity. For example, a misalignment between an optical fiber and a PIC of 1-2 microns (μm) would result in a signal loss of about −3 db. Furthermore, the alignment is now performed with expensive equipment or labor-intensive assembly solutions. As a result, mass production of PICs and/or optical couplers is not feasible.

The lack of a reliable and efficient solution for optical coupling of PICs also limits the ability of mass production for an electrical-optical interconnection platform that allows multiple-chip connections via electrical and optical connections.

As an example, one typical arrangement of electrical-optical interconnection platform is based on a silicon photonic interposer. Such an interposer may be utilized in a hybrid integration of photonics and electronics by face-to-face bonding (flip-chip assembly). In such arrangement the I/O fibers are connected to waveguides pre-designed in the silicon interposer. The silicon photonic interposer includes vias created through the silicon to provide the electrical path to/from the PCB substrate and the optoelectronic devices inside the silicon photonics die. The optical transmission is inside the silicon photonics die.

Another arrangement discussed in the related art, is a multi-substrate electro-optical structure. The structure includes a substrate mounted over a supporting PCB. The substrate interconnections between optical chips, mounted on the silicon photonic interposer, and IC chips.

The typical arrangements discussed above are based on a silicon photonic interposer. Such an interposer typically includes active and passive optical devices (e.g., photodetectors, modulators, splitters, etc.). An "active" interposer is an expensive component manufactured using a complex process. Further, the optical source (e.g., laser light) is coupled to the silicon photonic interposer via an optical fiber and grating coupler, or via an edge-coupling or any other equivalent optical coupling. As noted above, such coupling techniques require precise alignment and active positioning of the optical source to the PIC or the interposer.

Another solution for electrical-optical interconnection platform includes assembling of discrete electrical and optical device on a silicon photonics substrate. The electrical connection is achieved using electrical pins formed using through glass vias (TGV) while optical connections are formed using optical pins. The optical pins are structured using optical grating couplers. As noted above, such couplers do not demonstrate good tolerance for misalignment. As a result, a mass production of PICs and/or optical couplers of the various electrical-optical interconnection platform solutions discussed in the related art may not be feasible.

It would therefore be advantageous to provide an efficient electrical-optical interconnection platform that would overcome the deficiencies of the existing solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include an electro-optical interconnection platform comprises an interface medium; a plurality of optical pads; a plurality of electrical pads; and at least one beam coupler adapted to optically couple at least one pair of optical pads of the plurality of optical pads, wherein the at least one pair of optical pads are placed on opposite sides of the interface medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
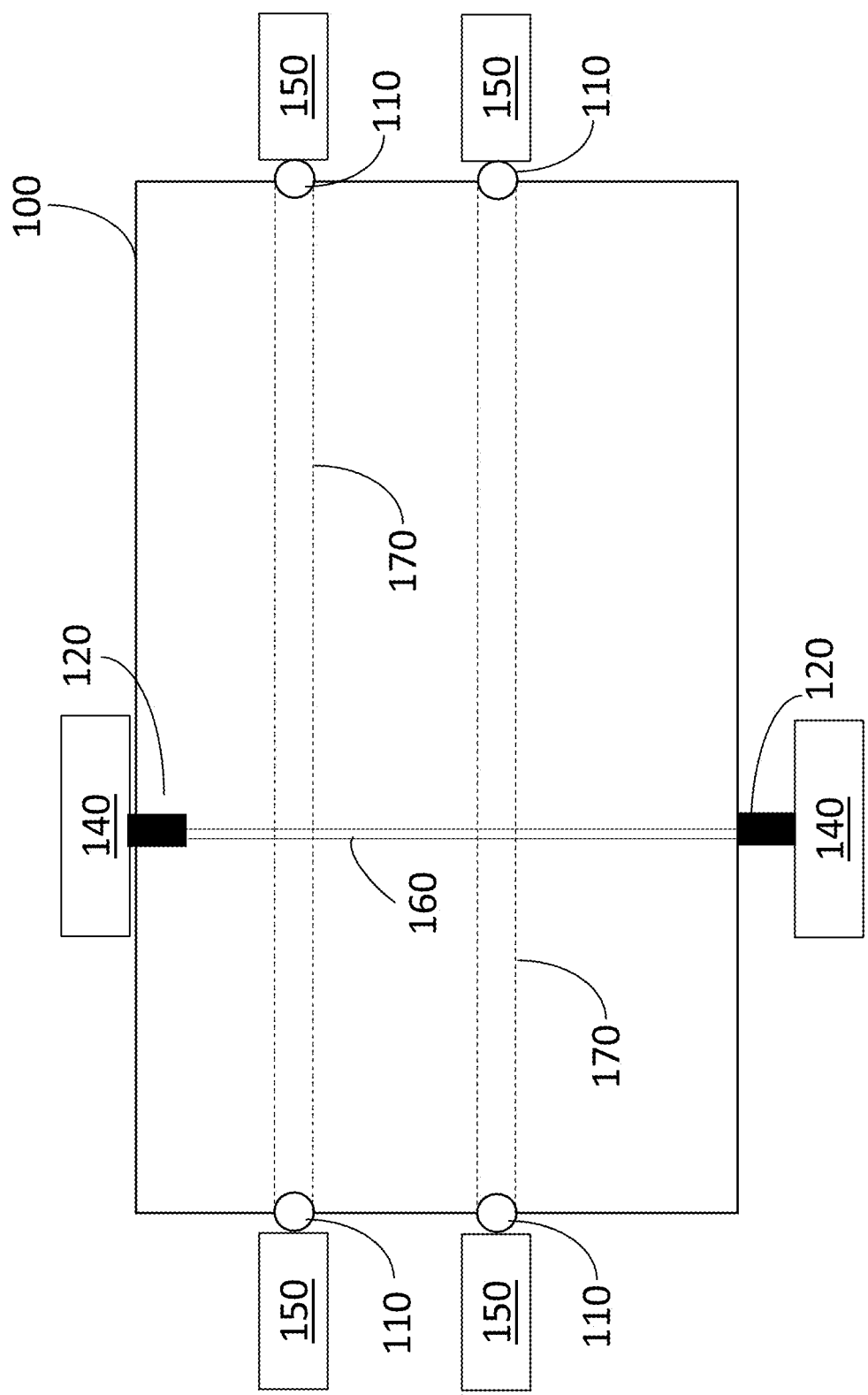
FIG. 1 is a side view of a fiber-to-chip optical coupler constructed according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the various disclosed embodiments, a platform for electro-optical interconnection is provided. The arrangement of the disclosed platform allows efficient interconnection of, for example, different electronic integrated circuits (ICs) (e.g., electrical chips), photonic integrated circuits (PICs) (e.g., photonic chips), and other optical elements (e.g., fibers and lasers), while ensuring low signal losses and thermal stability.

To this end, the platform includes a passive interposer and a set of optical pads. That is, the interposer does not include any active components or devices, but merely serves as an interface media. The optical pads allow optical connectivity through an optical coupler (or a photonic plug). The optical coupler is designed to provide high tolerance alignment through passive positioning or assembling. Therefore, the disclosed electro-optical interconnection platform allows components assembling with standard packaging machinery, and therefore can enable high volume packaging. In an embodiment, a complete system that utilizes the disclosed platform can be fabricated using a wafer fabrication process, for example, a CMOS fabrication process. Thus, the disclosed embodiments can solve a long unmet need for using wafer fabrication processes in the manufacturing of silicon photonics based systems.

FIG. 1 shows a high-level schematic diagram of an electro-optical interconnection platform 100 constructed according to one embodiment. The platform 100 includes a plurality of optical pads (collectively shown and referred to as "o-pads" 110 and a plurality of electrical pads (collectively shown and referred to as "e-pads" 120 formed on an interface medium (not shown)). The e-pads 120 can be, for example, bumps, micro solder bumps, or any other type of metal pads to enable electrical connections. Electrical connections between e-pads 120 can be achieved through vias 160, such as, but not limited to, through silicon vias (TSV), through glass vias (TGV), and the like.

In an embodiment, each o-pad 110 is constructed as an optical element, such as curved (collimated) mirror, a titled flat mirror, or combination thereof. In an embodiment, the positioning and formation of the o-pads (curved mirror) is performed on the interface medium (not shown) using a photolithography process such as, but not limited to (e.g., grayscale lithography), a nanoimprint lithography process, and the like. In certain configurations, an o-pad 110 may also be constructed to include a tilted flat mirror and fiber trench (not shown in FIG. 1). In such configurations, an o-pad 110 allows connection of an optical fiber.

A beam coupler 170 can be formed between two opposite o-pads 110. In an embodiment, the beam coupler 170 allows the optical coupling between an optical source and drain connected the respective o-pads 110. The structure of the o-pads 110 and the optical coupling formed by the platform 100 is disclosed in great detail below.

In an embodiment, the light beams travel through an interface medium (not shown). Such a medium is made of transparent and non-conductive material, such as glass, polydimethylsiloxane, or any other index matching materials. The dimensions of the interface medium determine, in part, the efficiency of the light beam (optical signal) that propagates through the interface medium. In one embodiment, the interface medium is realized as a passive interposer.

It should be noted the geometric of the vias 160 and/or beam couplers 170 shown in FIG. 1 is for illustration purposes only and should not limit the scope of the disclosed embodiments.

It should be further noted the o-pads 110 and the e-pads 120 can be positioned at any location on the platform 100. However, to form a beam coupler between two o-pads 110, such o-pads should be opposite to each other when placed on the platform 100.

The e-pads 120 allow electrical connectivity to an electrical component 140. An electrical component 140 may include, for example, a driver, a field programmable gate array (FPGA), an application-specific integrated circuit (ASIC), an application-specific standard products (ASSP), a system-on-a-chip system (SOC), a general-purpose microprocessor, a microcontroller, a GPU, a digital signal processors (DSP), and the like, or any other analog or digital circuit. Furthermore, one or more of the e-pads 120 may provide connectivity with a PCB.

To o-pads 110 are connected or otherwise mounted optical components 150. An optical component 150 may include, for example, a PIC, a light source (e.g., laser), an optical fiber, a photo-detector, an optical splitter, an optical combiner, an optical tap, or any other passive or active optical component. In an embodiment, a PIC is mounted on the platform 100 and connected to an o-pad 110 using a flip-chip mounting technique. This would provide the mounted PIC electrical and optical connectivity required for its operation.

Thus, the platform 100 is designed to enable standard die stacking processes (e.g., pick-and-place assembly) of the electrical and optical components through connections to e-pads using a flip-chip mounting technique. As a result, an electro-optical system assembled on the disclosed platform can be manufactured, tested, and packaged using wafer level processes. Further, the disclosed platform can be utilized to provide chip-chip connectivity. For example, connections between two PICs or two ICs can be formed through the disclosed interconnection platform 100.

The design of the electro-optical interconnection platform 100 may be achieved by distribution of o-pads 110 and e-pads 120 throughout the platform 100. The characteristics of the o-pads 110 and e-pads 120 may be selected from design libraries included in a CAD design tool.

Figure 2:
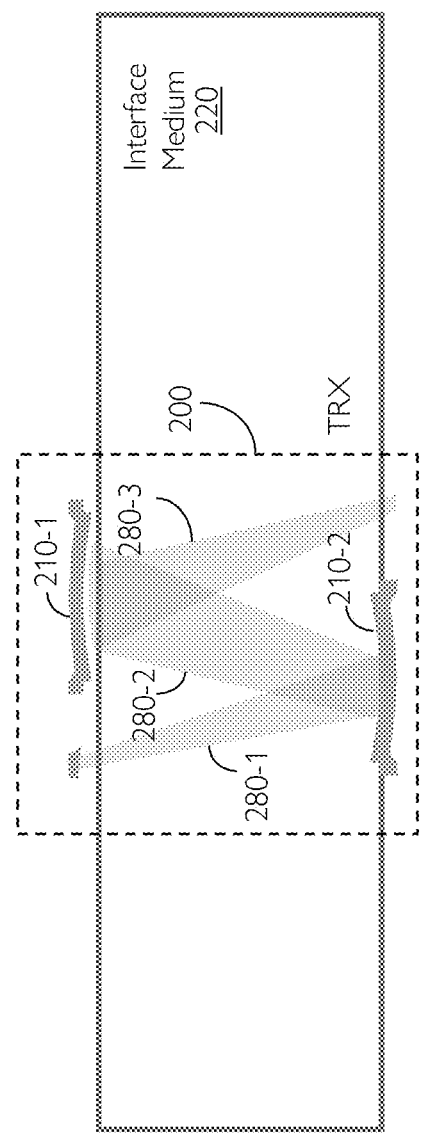
FIG. 2 is a top view of the "fiber side" of the disclosed arrangement according to one embodiment.

FIG. 2 is a side view of a portion of the electro-optical interconnection platform 100 illustrating a beam coupler 200 formed between o-pads 210-1 and 210-2 constructed according to one embodiment. The o-pads 210-1 and 210-2 are positioned on opposite sides of the interface medium 220. The material of the medium 220 may be any transparent and non-conductive material, such as glass, polydimethylsiloxane or any other index matching materials. In an embodiment, the interface medium 220 may be of a combination of materials. As an example, the interface medium 220 may be structured as an upper substrate layer and a lower substrate layer and a glass or air layer in-between. The substrate layers may be made of silicon oxide (SiO$_2$), plastic, and the like.

In certain configurations, the interface medium 200 may be adhered to a transparent glue layer (e.g., Epoxy). Such a layer may be placed between the interface medium 220 and the mirrors 210-1 and 210-2.

As noted above, the o-pads 210-1 and 210-2 are formed on the interface medium 220 using a photolithography, grayscale lithography, nanoimprint lithography process, and the like. Specifically, in an embodiment, the o-pads 210-1 and 210-2 are formed as curved, collimated mirrors. The o-pads (curved mirrors 210-1 and 210-2 are placed and created during fabrication, which ensures high accuracy positioning and accurate reflective mirrors. As a non-limiting example, the fabrication process utilized to create the mirrors may include a Silicon-On-Insulator (SOI), complementary metal-oxide semiconductor (CMOS), and the like.

In an embodiment, the o-pads 210-1 and 210-2 are fabricated using the same or a substantially similar grayscale lithography process. In another embodiment, the o-pads 210-1 and 220-2 may be fabricated using a plastic molding technique. Such fabrication techniques ensure high accuracy of the mirrors and their assembly to form a beam coupler.

Furthermore, by fabricating and placing the first and second curved mirrors 210-1 and 210-2 on the interface medium 220, thereby allowing relaxed alignment tolerances in 3-dimenstions. For example, if the o-pad 210-2 provides a connection to a light drain (e.g., PIC, not shown) and the o-pad 220-1 is connected to a light source (not shown), even if the o-pad 220-2 is not perfectly aligned with the o-pad 220-1, the optical signal is not significantly attenuated. It should be noted that in certain embodiments, the o-pads 210-1 and/or 210-2 can be also fabricated as a part of the interface medium 220.

The disclosed arrangement of the beam coupler 200 achieves high signal efficiency with a relaxed alignment between a light beam and/or drain due to the specific locations and shape of the curved mirrors (forming the o-pads) placed against each other. The locations of the o-pads 210-1 and 210-2 are determined at least with respect to the source/drain light beam. This allows the light beam to be reflected from the o-pads 210-1 and 220-2. Specifically, the curved mirrors of the o-pads 210-1 and 210-2 are shaped in such a way that all light beams from the source are reflected and collimated at a certain angle at a center of one o-pad and focused to a drain after reflecting from the second o-pad.

For example, as illustrated in FIG. 2, the o-pad 210-2 reflects a diverging light beam 280-1 from a light source (not shown) into parallel or substantially parallel light beams 280-2. The light beams 280-2 reach the o-pad 210-1 which reflects a focused light beam 280-3 to a light drain (not show). The same optical path is true if the location of the source and drain are replaced. It should be noted that all light beams 280 travel through the interface medium 220.

It should be noted that a typical application of the electro-optical interconnection platform 100 would include a plurality of beam couplers formed through a plurality of o-pads.

In certain embodiments, an o-pad can be constructed to further allow connectivity to an optical fiber (including, but not limited to, a single mode fiber). Such an o-pad may be integrated in an o-pad shaped as a curved mirror (e.g., o-pad 210-2) or serve as a stand-alone connection.

Figure 3:
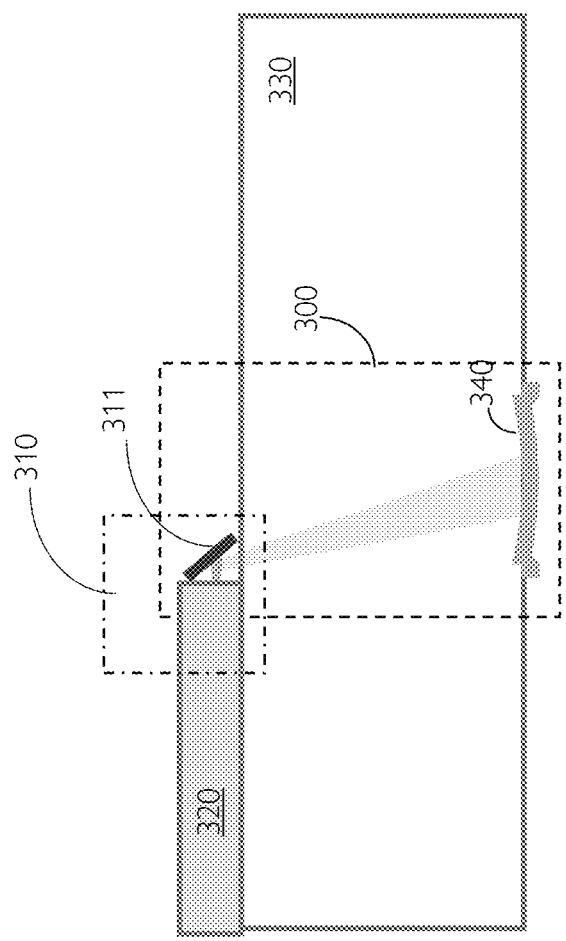
FIG. 3 is an exemplary and non-limiting top view of the "fiber side" of the disclosed arrangement according to another embodiment.

FIG. 3 illustrates a portion of the electro-optical interconnection platform 100 including a beam coupler 300 formed using an o-pad 310 construed to provide optical coupling to an optical fiber according to an embodiment. The o-pad 310 is shaped as a tilted flat mirror 311 in a fiber trench (not shown in FIG. 3).

In the beam coupler 300, the tilted flat mirror of the o-pad 310 is utilized to direct a light beam from the optical fiber 320 to the o-pad 340 (having a curved mirror).

The tilted flat mirror of the o-pad 310 is fabricated in the interface medium 330 and can be formed by means of anisotropic grayscale etching and tilted at a predefined angle. The angle is determined based on the optical path between the optical fiber 320 and the titled mirror.

In an embodiment, the o-pad 310, its tilted flat mirror 311 and the fiber trenches are placed using the same lithography mask alignment accuracy. In another embodiment, the o-pad 310 and its tilted flat mirror 311 are placed using a first lithography mask alignment accuracy, and the fiber trenches are placed using a second lithography mask alignment accuracy.

It should be noted that in a typical arrangement, a plurality of o-pads 310 can be utilized to connect a plurality of optical fibers using a plurality of fiber trenches. Such an arrangement is further illustrated in FIG. 3 which shows an exemplary and non-limiting top view of the "fiber side" of the disclosed arrangement. In a further embodiment, an o-pad 310 may be constructed to include a titled flat mirror and a curved mirror.

Figure 4:
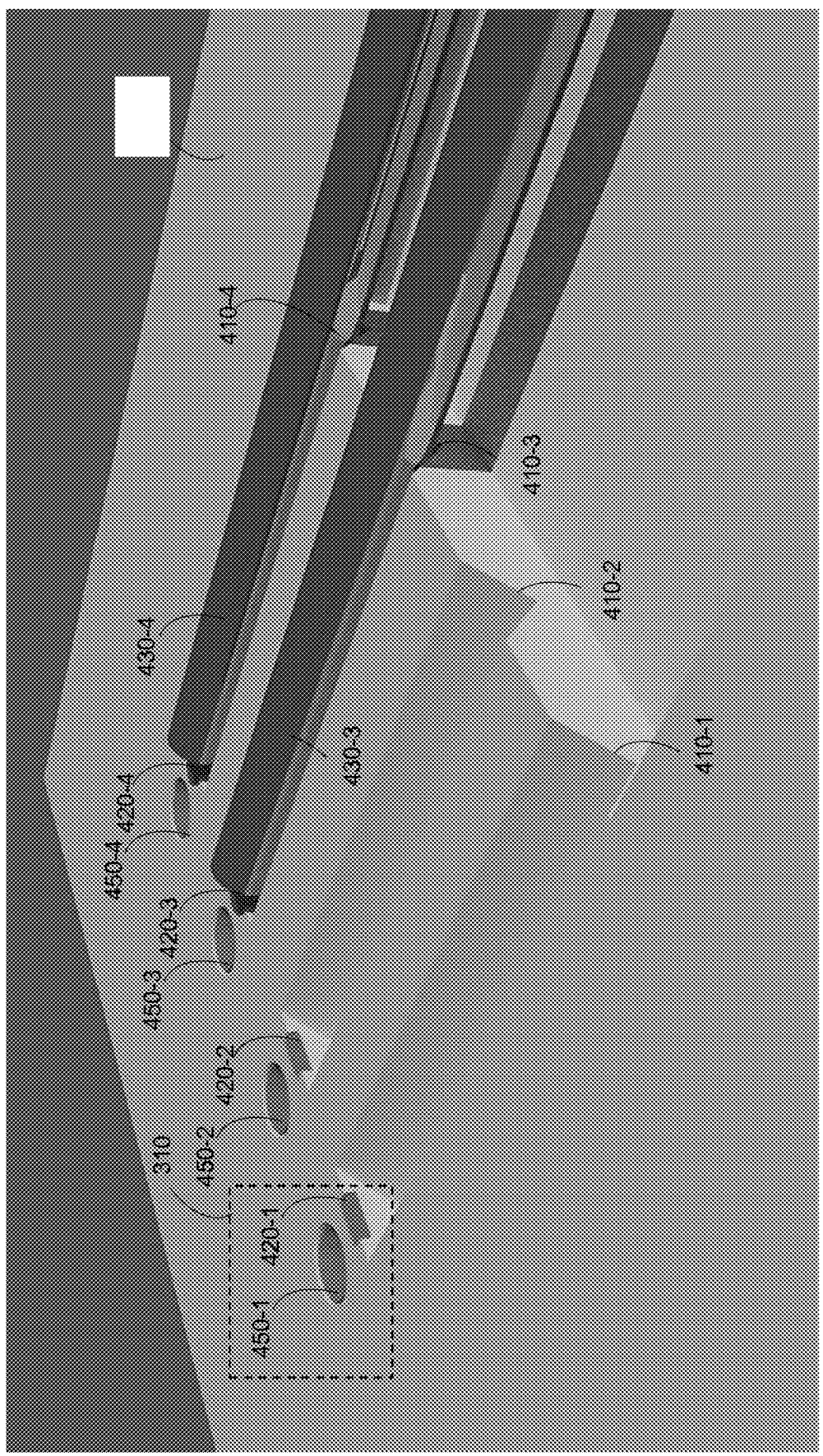
FIG. 4 is a side view of a chip-to-fiber optical coupler utilized as a beam coupler arranged according to one embodiment.

FIG. 4 illustrates four (4) fiber trenches 410-1 through 410-4 (hereinafter referred to individually as a fiber trench 410 and collectively as fiber trenches 410, merely for simplicity purposes). Each fiber trench 410 adjoins a tilted flat mirror 420 to form an o-pad 310. The fiber trench 410 is shaped as a groove etched in the interface medium (or a substrate layer attached thereon). Optical fibers 430-3 and 430-4 are placed in the fiber trenches 410-3 and 410-4, respectively.

In an optional embodiment, illustrated in FIG. 4, a curved mirror 450 is also formed. In this embodiment, as an example, a fiber trench 410-1, a tilted flat mirror 420-1, and a curved mirror 450-1 form an o-pad 310-1.

It should be noted that only 2 optical fibers 430-3 and 430-4 are shown in FIG. 4 merely for illustrative purposes. Other numbers of optical fibers may be utilized without departing from the scope of the disclosed embodiments. The exemplary arrangement shown in FIG. 4 can support the formation of 4 different beam couplers. It should be noted that the number of optical fibers that can be supported can be greater than four. It should be further noted that the fiber trenches illustrated in FIG. 4 are shaped as V-grooves. However, any type of groove shape can be utilized, such as square, cylinder, diamond, and the like.

Figure 5A:
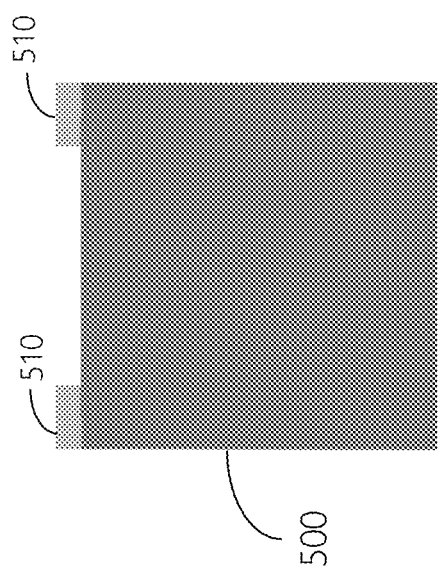
FIGS. 5A through 5D illustrate a process for creating a fiber trench at a side view of the substrate layer according to an embodiment.
Figure 5B:
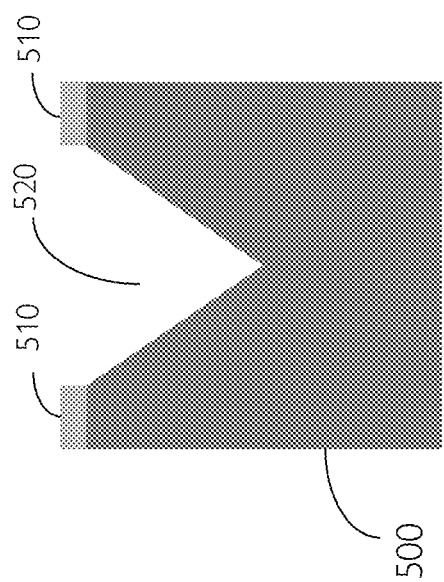
Figure 5C:
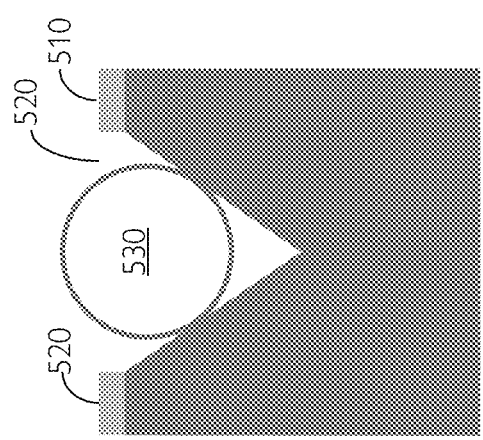
Figure 5D:
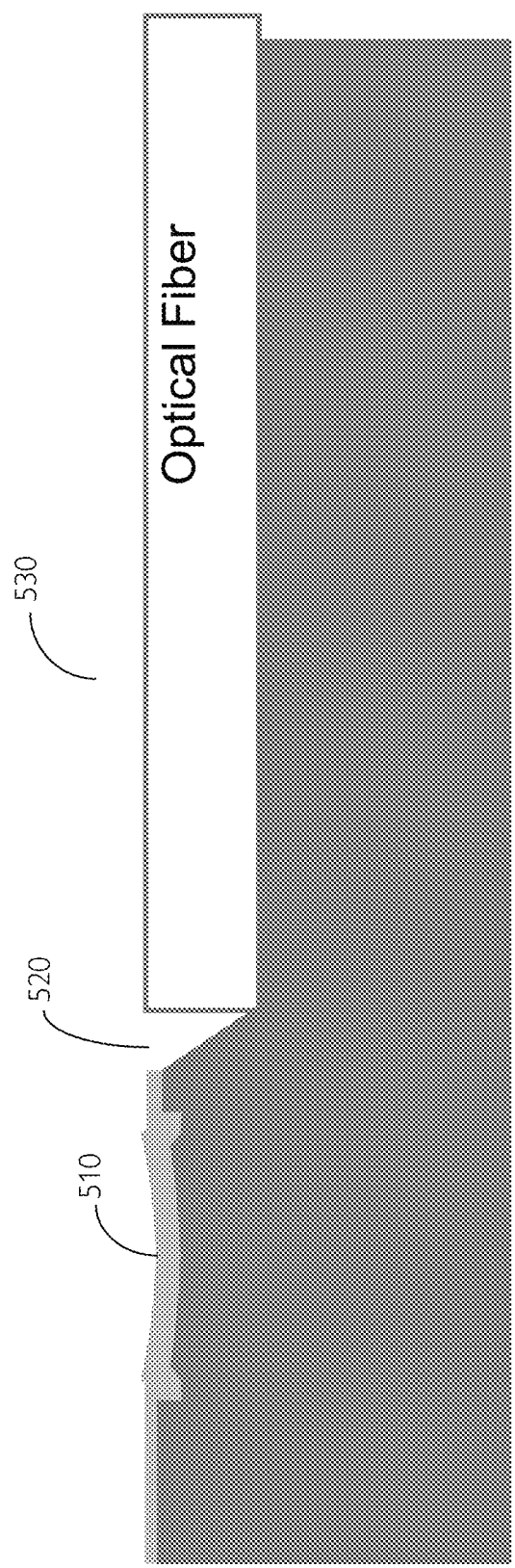

The process for creating a fiber trench 410 is further described with reference to FIGS. 5A through 5D. FIG. 5A is a side view of the beam coupler 200. At first, only the curved mirror of an o-pad 510 is placed on the interface medium 500. Then, as shown in FIG. 5B, a groove is etched in the interface medium 500 to create the fiber trench 520 (similar to the trench 410, FIG. 4). Finally, an optical fiber 530 is placed in the fiber trench 520 (FIG. 5C). FIG. 5D shows a side view of the beam coupler 200 with the attached optical fiber 530.

Figure 6:
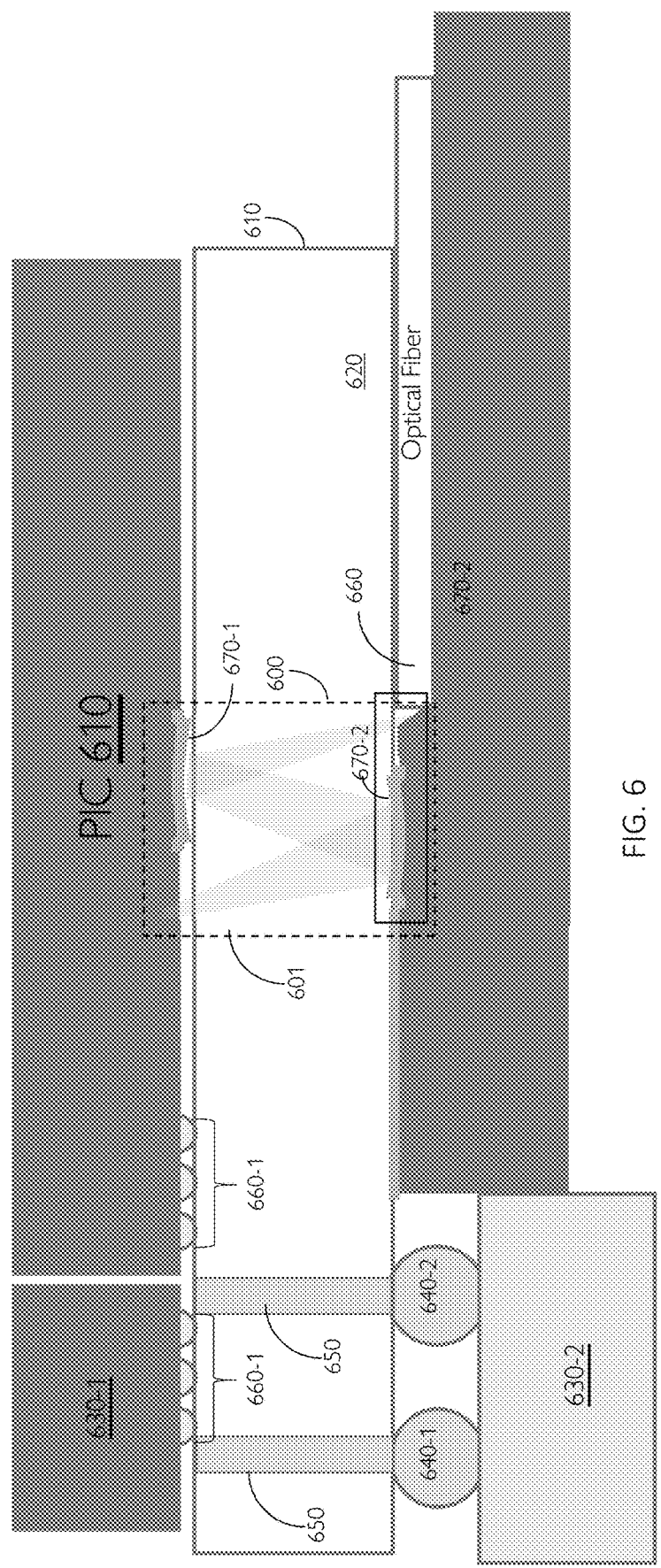
FIG. 6 is a side view of an electro-optical interconnection platform arranged according to one embodiment.

FIG. 6 is a side view of an electro-optical interconnection system 600 arranged according to one embodiment. In this arrangement, a PIC 610 is flipped and placed on an electro-optical interconnection platform.

IC 630-1 is connected to the PCB 630-2, both including only electrical elements, are also coupled to the platform 610. The ICs 630-1 and 630-2 are coupled to the platform 610 using e-pads 640-1, and 640-2, respectively. The connection between the ICs 630-1 and 630-2 are through vias or wire bounding 650.

The connection of the PIC 610 to the platform 600 is by means of an o-pad 670-1. The connection of the optical fiber 660 to the platform 600 is by means of an o-pad 670-2. The o-pad 670-1 is structured using, for example, a curved mirror, while the o-pad 670-2 is structured to include a curved mirror, a tilted mirror, and a fiber trench as discussed in detail above.

The optical connection between the PIC 610 and an optical fiber 660 is through a beam coupler 601 which comprises the o-pads 670-1 and 670-2. In this arrangement, the light beam travels through the beam coupler 601 from the PIC 610 to the optical fiber 660 serving as a drain. The o-pad 670-2 reflects a diverging light beam from the PIC 610 into parallel light beams which reach the o-pad 670-1, which reflects a focused light beam to a titled mirror in the o-pad 670-2 to output the light to the optical fiber 660.

The various optical couplers have been discussed herein with a reference to a specific embodiment with curved mirrors utilized for propagating light beams. However, the disclosed embodiments can be realized using other reflective or focusing elements, such as optical lenses, zone plates (e.g., Fresnel zone plates), and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An electro-optical interconnection platform, comprising:
    an interface medium;
    a plurality of optical pads;
    a plurality of electrical pads; and
    at least one beam coupler adapted to optically couple at least one pair of optical pads of the plurality of optical pads, wherein the at least one pair of optical pads includes a first optical pad and a second optical pad that are placed substantially on opposite edges of the interface medium,
    wherein the beam coupler optically couples a light optical source, adjacently placed and connected to the first optical pad and a light optical drain adjacently placed and connected to the second optical pad,
    wherein the first optical pad diverges a light beam from a light source into substantially parallel light beams, and
    wherein the second optical pad is designed to reflect a focused light beam to a light drain, and wherein the light beams travel through the interface medium.

2. The electro-optical interconnection platform of claim 1, wherein an electrical pad of the plurality of electrical pads is connected to an electrical component.

3. The electro-optical interconnection platform of claim 2, wherein the electrical component includes any one of: an analog circuit, a digital circuit, and an analog-digital circuit.

4. The electro-optical interconnection platform of claim 2, wherein two or more electrical pads of the plurality of electrical pads are connected to each other through vias.

5. The electro-optical interconnection platform of claim 1, wherein an optical pad of the plurality of optical pads is connected to an optical component.

6. The electro-optical interconnection platform of claim 5, wherein the optical component includes any one of: a passive optical component, an active optical component, and a passive-active optical component.

7. The electro-optical interconnection platform of claim 1, wherein optical components and electrical components are connected to the platform using a die stacking process.

8. The electro-optical interconnection platform of claim 1, wherein each of the plurality of optical pads is structured as any one of: a curved mirror, a titled flat mirror, and a combination of curved and titled flat mirror.

9. The electro-optical interconnection platform of claim 1, wherein each of the plurality of optical pads is formed and positioned on the interface medium using at least any one of: a photolithography process and a nanoimprint lithography process.

10. The electro-optical interconnection platform of claim 1, wherein the interface medium is made of transparent and non-conductive material.

11. The electro-optical interconnection platform of claim 1, wherein the interface medium is structured as an upper substrate layer, a lower substrate layer, and glass or air in-between the layers.

12. The electro-optical interconnection platform of claim 11, wherein the plurality of optical pads are fabricated over the upper substrate layer and the lower substrate layer.

13. The electro-optical interconnection platform of claim 1, wherein the beam coupler forms an optical path between each pair of the at least one pair of optical pads.

14. The electro-optical interconnection platform of claim 1, wherein a first optical pad is connected to a light optical fiber, wherein the first optical pad directs a light beam from a light optical fiber to a second optical pad; and wherein the first optical pad is structured as a tilted flat mirror and the second optical pad is structured as a curved mirror.

15. The electro-optical interconnection platform of claim 14, wherein the optical fiber is disposed in a fiber trench.

16. The electro-optical interconnection platform of claim 15, wherein the fiber trench etched in the second substrate layer.

* * * * *